United States Patent [19]

Welles, Jr.

[11] 3,876,548
[45] Apr. 8, 1975

[54] SCREENING METHOD AND APPARATUS
[75] Inventor: Donald P. Welles, Jr., Lake Bluff, Ill.
[73] Assignee: Hydrocyclonics Corporation, Lake Bluff, Ill.
[22] Filed: Jan. 21, 1974
[21] Appl. No.: 435,163

Related U.S. Application Data
[63] Continuation-in-part of Ser. No. 294,076, Oct. 2, 1972, abandoned, which is a continuation-in-part of Ser. No. 265,279, June 22, 1972, abandoned.

[52] U.S. Cl. ............... 210/391; 210/402; 210/497.1
[51] Int. Cl. ............................................ B01d 33/06
[58] Field of Search ...... 55/489; 209/284, 285, 288; 210/77, 79, 75, 82, 157–162, 326, 391, 393, 386, 401, 402, 497, 497.1, 498, 499

[56] References Cited
UNITED STATES PATENTS

| | | | |
|---|---|---|---|
| 799,153 | 9/1905 | Fullner | 210/386 |
| 828,715 | 8/1906 | Cook | 210/497 |
| 1,449,622 | 3/1923 | Peck | 210/391 X |
| 1,577,584 | 3/1926 | Miller, Jr. | 210/402 X |
| 2,022,336 | 11/1935 | Bower | 210/157 |
| 2,167,322 | 7/1939 | Cuno et al. | 210/393 X |
| 2,294,179 | 8/1942 | Hawley | 210/386 X |
| 2,765,915 | 10/1956 | Nilsson | 210/75 X |
| 3,145,164 | 8/1964 | Jonkman | 209/288 X |
| 3,349,916 | 10/1967 | Magson | 210/161 X |
| 3,630,379 | 12/1971 | Sharples | 210/497.1 X |

Primary Examiner—John Adee
Assistant Examiner—Robert H. Spitzer
Attorney, Agent, or Firm—Kinzer, Plyer, Dorn & McEachran

[57] ABSTRACT

A structure for dewatering solids uses a rotating cylindrical screen, with the water, after being separated from the solids, being used to clean the screen. The screen is continuously cleaned as it rotates, not only by the separated water, but by one or more wipers which are positioned to bear against the external surface of the screen. The combination of the separated water for self-cleaning and the cleaning action of the external wipers maintains the screen in a substantially solid-free state in those areas which receive the incoming stream of solids and water. The screen is made up of generally parallel bars, each bar having an outer face and immediately adjacent sides. The angle formed by a line perpendicular to the outer face and an immediately adjacent side is greater than about 7° and less than about 45°. The screen must have a minimum diameter of about 11 inches and a ratio of screen diameter to bar radial thickness greater than about 75.

9 Claims, 14 Drawing Figures fig.1.

SCREENING METHOD AND APPARATUS

This application is a continuation-in-part of my copending application Ser. No. 294,076, filed Oct. 2, 1972, now abandoned which was a continuation-in-part of application Ser. No. 265,279, filed June 22, 1972, now abandoned.

SUMMARY OF THE INVENTION

The present invention relates to a means for dewatering solids and has particular direction to a rotating cylindrical screen which is continuously cleaned during use.

A primary purpose of the invention is a screening system utilizing a rotating cylindrical screen with the separated water providing a self-cleaning action for the screen.

Another purpose is a screening device in which the screen bars are arranged in a generally parallel manner and in which each bar has an outer face and immediately adjacent sides, with the angle formed by a line perpendicular to the outer face and an immediately adjacent side being greater than about 7° and less than about 45°.

Another purpose is a screening device of the type described having a minimum diameter of about 11 inches and a ratio of screen diameter to bar radial thickness greater than about 75.

Another purpose is a screen of the type described in which the screen is made up of generally parallel bars, with the ratio of bar radial thickness to bar face width being greater than 1 and less than 2.

Another purpose is a screening system including wipers positioned along the periphery of the screen to remove the solids and thus provide a clean area for the incoming stream of water and solids.

Another purpose is a screening system utilizing a plurality of generally parallel screens to dewater solids.

Another purpose is a screening system of the type described in which the combination of the screening surface, screen rotation and the angle of the screen axis combine to move the separated solids toward the discharge end of the screen.

Another purpose is a simply constructed reliably operable screening system of the type described.

Another purpose is a screening system which will provide a consistent weight of separated solids.

Another purpose is a rotating cylindrical screen including means for concentrating the separated water to increase the self-cleaning function of the screen.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

One of the major concerns with prior screens for dewatering solids, regardless of the field of application and regardless of whether it be a static screen or a rotary screen, is to maintain a sufficiently clean screen such that the weight of the separated solids is consistent. When the weight of the solids is consistent, there is essentially no water in the solids and the solids have been totally dewatered. The present invention specifically provides a rotary screen device in which there is both self-cleaning of the screen and cleaning by external means, such as wipers. The combination of both types of cleaning provide a screen which is highly efficient in providing consistently dry solids over prolonged periods. The particular screening apparatus shown has wide application. It may be used in sanitary sewage applications, separation of textile fibers or other types of fibers. The apparatus shown may be used in poultry farming, vegetable processing, food processing, meat packing, and a wide range of other applications in which it is desired to separate solids from liquid. The type of application will dictate the speed of the screen, the size of the opening between adjacent screen bars, as well as other variables within the apparatus.

Essentially, the screening apparatus utilizes a rotary cylindrical screen which is suitably supported and suitably driven. In one form of the invention, a stream of liquid with solids is introduced above the screen and generally adjacent one end. In another form of the invention, liquid and solids are introduced along one side of the screen. The rotation of the screen will tend to move the solids to one side and the water will pass down through the screen openings. Wiper blades are positioned along one or both sides of the screen to clean it, thus providing an open area to receive the stream to be separated. After the solids have been removed, the water passes from the outside of the screen to the inside, and then from the inside to the outside. As the water passes from inside the screen to the outside, it will remove any solids which have adhered to the screen, thus providing a self-cleaning action. Although the screen element may take many shapes, preferably it is in the form of a plurality of bars or a single bar arranged in a helix such that the lead of the helix, the direction of rotation of the screen and the angle of the screen with the horizontal assist in directing the separated solids toward the discharge end of the screen.

Of particular importance is the construction of the screen itself. The screen is preferably made up of parallel bars, supported in a suitable manner and arranged perpendicular to the axis of the screen. The bars preferably have a wedge-shaped cross section, although this may vary. Each bar has an outer face or outer surface, and in the wedge-shaped cross section there are inwardly tapering sides which terminate immediately adjacent the outer surface. Preferably, the angle formed by a tapering side and a line perpendicular to the outer surface is greater than about 7° and less than about 45°. The relationship between screen diameter and bar size is important. The screen should have a minimum diameter of about 11 inches and a ratio of screen diameter to bar radial thickness greater than about 75.

It has been found that if the angle described above is less than about 7°, there is a packing between bars of the spongy material being separated. Such spongy material is difficult to remove by the flushing action of the screened water. On the other hand, if the angle is too great, greater than about 45°, the strength of the bar is weakened to the point where the screen is not sufficiently rigid to withstand normal use. In addition, because the screen is self-cleaning through the media of the filtered water, it is desirable to have a sufficiently wide screen opening at the inside, so as to channel the cleaning water toward the outside of the screen. When the angle is too small, there is not enough water captured by the tapered bars, and thus there is insufficient cleansing action. In this connection, a screen formed of bars having an angle as described above of less than about 7° began operating in a sewage treatment process with an initial flow rate of approximately 400 gallons per minute. Within three days the flow rate was down to 250 gallons per minute as the screen was not self-cleaning because of the small angle between adjacent bars. A similar screen, having a screen wire angle of approximately 13° operated over a period of 60 days at a constant flow rate.

The relationship between the size of the screen and the diameter of the screen and the thickness of the bar making up the screen is similarly important. Unless there is sufficient free fall of the cleansing water to flush the screen, the necessary self-cleaning will not be present.

Figure 1:
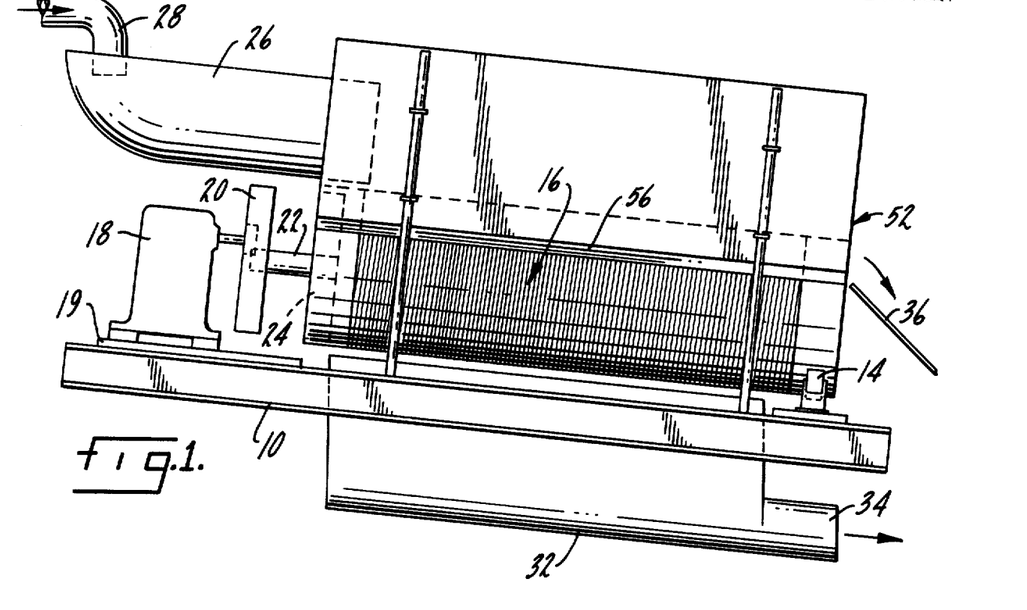
FIG. 1 is a side view of a screening system of the type described.
Figure 2:
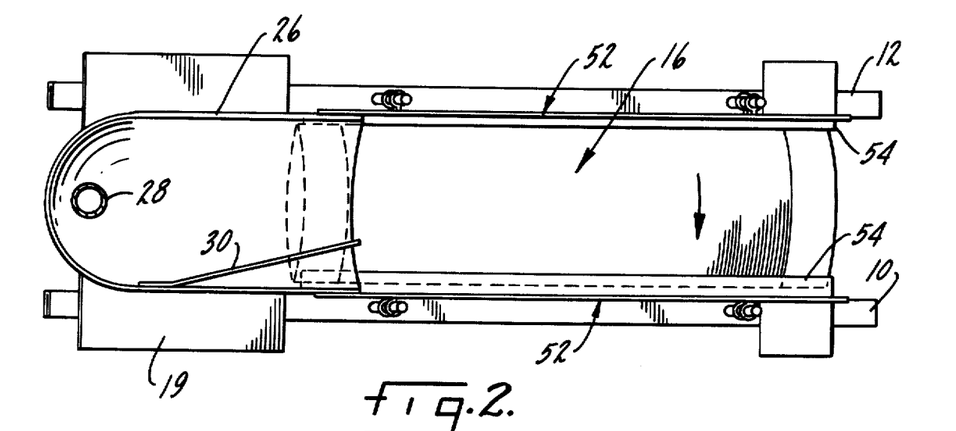
FIG. 2 is a top plan view of the screening system of FIG. 1.

In FIGS. 1 and 2 a pair of support rails are indicated at 10 and 12. Rollers 14 are positioned on the rails 10 and 12 and support the discharge end of the screen. A suitable bearing may be used instead of rollers in some applications. A suitable drive motor 18 positioned on a platform 19 supported by the rails 10 and 12 drives a gear train 20 which in turn drives a shaft 22 fixed to a drive member 24 on the inside and at one end of the screen 16. Thus, the drive motor 18 shows a typical means for providing rotary movement for the screen 16.

A chute or flume 26 receives a stream of liquid with solids entrained from a discharge pipe 28 positioned at one end of the chute 26 and slightly above it. A baffle 30 is positioned in the chute 26 and is effective to direct the incoming stream to one side of the screen 16. The baffle 30 is thus effective to vector the material to be screened to an area of the screen which is always clean and free from solids.

Positioned below the screen 16 and in general alignment with it is a trough 32, illustrated particularly in FIG. 3, which is somewhat triangular in cross section and extends generally the length of the screen 16. At the discharge end of the trough 32 there is a pipe 34 which will convey the liquid after the solids have been removed.

Also at the discharge end of the screen 16 is a slide 36 which will direct the removed solids to a suitable point.

Figure 6:
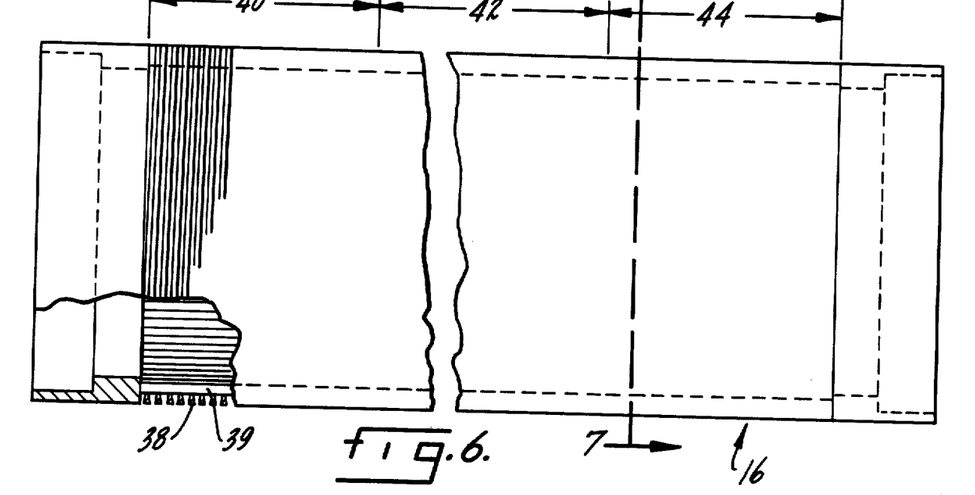
FIG. 6 is an enlarged plan view, in part section, detailing the cylindrical screen.
Figures 7, 8:
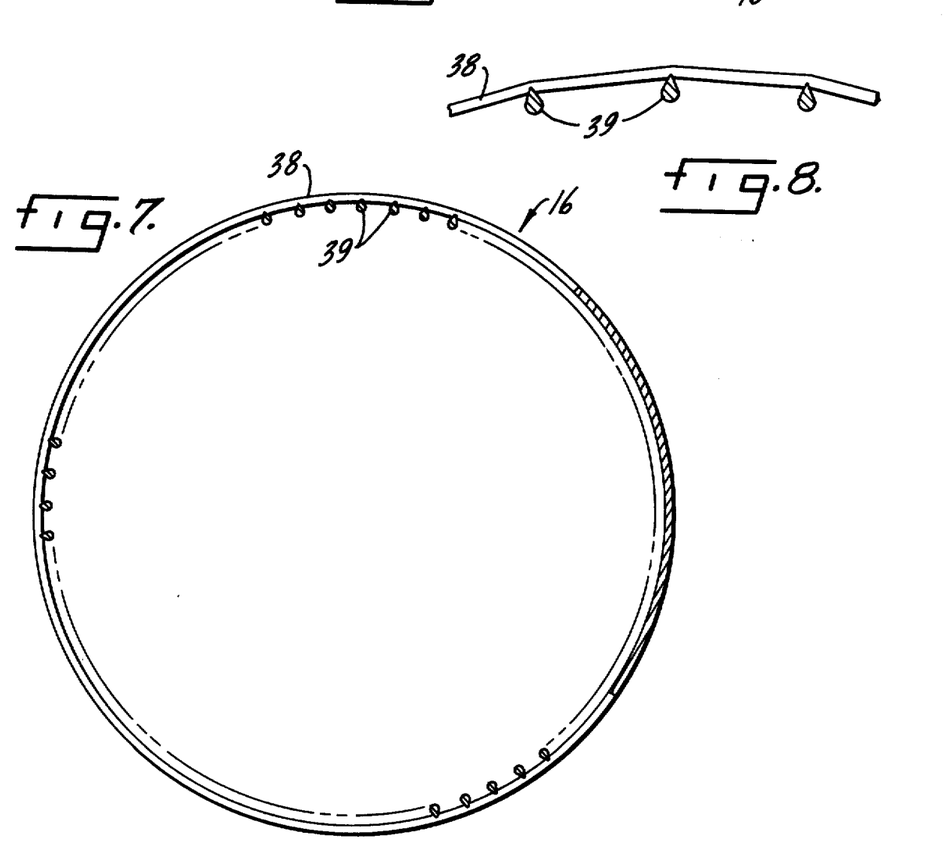
FIG. 7 is a section along plane 7—7 of FIG. 6.
FIG. 8 is an enlarged detail view showing the formation of the screen.

The screen itself is illustrated in detail in FIGS. 6, 7 and 8 and may be made up of a plurality of spaced bars 38 which are arranged in a helix and held together by means of transverse rods 39. In the space between adjacent rods, the individual sections may be straight as shown in FIG. 8. The bars have openings therebetween of a size consistent with the solids being filtered or screened. For example, in a sanitary sewage application, the openings may be 0.060 inch and smaller.

The spacing between openings may be uniform throughout the length of the screen or it may vary from one end of the screen to the other. In some applications the change in spacing between bars will uniformly vary, i.e., will uniformly increase or decrease, whereas, in other applications there will be a series of bars with one spacing followed by succeeding series of bars of different spacing. For example, as illustrated in FIG. 6, a group of bars indicated by the arrow 40 may have one spacing and may be positioned at the head end or near the inlet end of the screen. A second group of bars indicated by the arrow 42 may follow the group 40 and may have a slightly larger spacing with the group 42 being followed by a third group 44 having yet a larger spacing. In some applications, the spacing may decrease rather than increase. What is important is to provide a spacing between the bars which is consistent with the particular material to be screened and the desired particle size to be removed. The bars, as indicated above, are helically wound or formed so that there is a predetermined pitch or lead to the screen. This pitch assists in moving the solids from the inlet end to the discharge end so they may be removed by the slide 36 or by some other suitable means. It should be noted from FIG. 1 that the screen itself is not horizontal, but may form a slight angle to the horizontal. A 3–5° angle is satisfactory in some applications, but this will vary with the size and use of the screen. The slant of the screen assists the lead of the screen in moving the solids from the inlet end to the discharge end, as well as preventing any backfeed of water in a shock loading situation.

Figure 3:
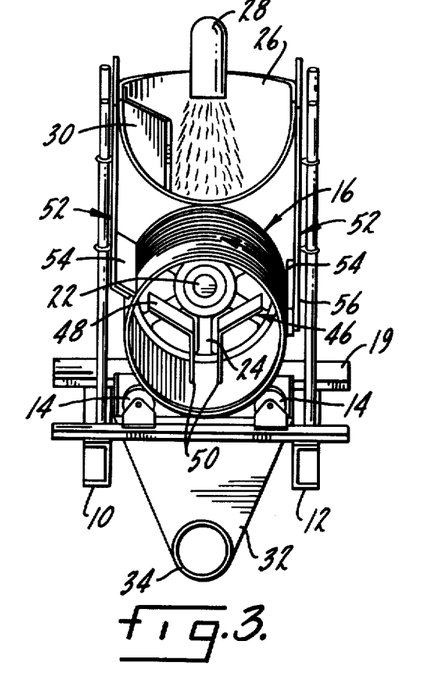
FIG. 3 is an end view of the screening system of FIG. 1.

As indicated in FIG. 3, an elongated funnel 46, which may be removable, is positioned inside of the screen. The funnel may have slanted sides 48 and generally vertically directed sides 50. The effect of the funnel is to concentrate the water or other liquid after it has passed through the screen into a defined and confined flow to clean the bottom of the screen directly below the funnel. The funnel is not necessary in every application, but particularly in larger screens it has been found to be satisfactory to assist the self-cleaning action of the water as it passes through the screen.

Figure 4:
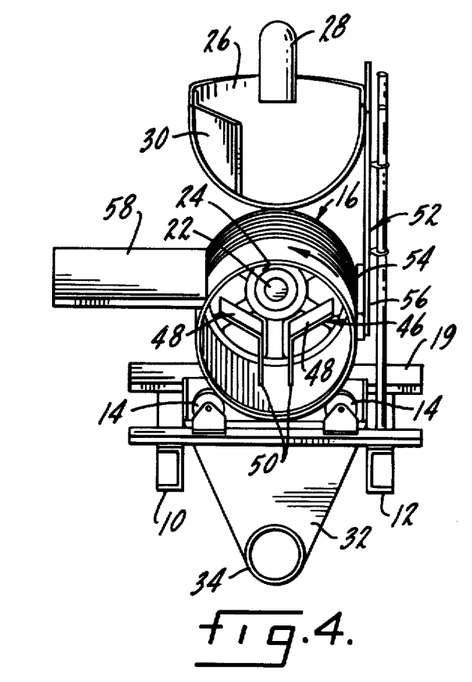
FIG. 4 is an end view, similar to FIG. 3, showing a modified form of screening system.

As illustrated particularly in FIG. 3, there may be a pair of wipers 52 positioned on opposite sides of the screen. Preferably the wipers or blades, commonly described in the field as "doctors," will consist of a blade portion 54 and an underlying support 56. Various materials may be used for the blade portion, but what is important is to provide a high degree of wear compatibility between the blade and the material of the screen. For example, the wipers may be an ultra high molecular weight polyethylene, teflon, or polyurethane. Stainless steel is a satisfactory material for the screen. The wipers may be at varying angles, as shown in FIG. 3, with the right-hand wiper being generally tangential to the screen. In FIG. 4 the right-hand wiper, illustrated at 52, is the same as in FIG. 3, with the left-hand wiper 58 being in the same plane as the screen axis. Generally speaking, the wiper should not slant downwardly from the screen surface, as this will tend to permit water to run off of the wiper. However, in some applications, depending upon the nature of the material being screened, this may be advantageous in assisting to remove the separated solids. In most applications, it is desirable to have two wipers or "doctors" to provide a cleaning action on the screen.

Figure 5:
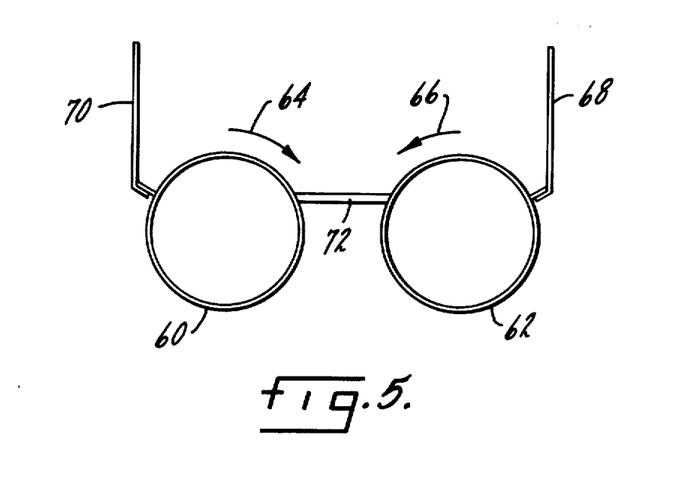
FIG. 5 is an end view showing a further modified form of screening system.

FIG. 5 shows a modified form of the invention in which a pair of screens are indicated at 60 and 62, each of which may be similar to the screen described above. The screens will rotate in the direction shown by arrow 64 and 66. The right-hand screen 62 may have a wiper 68 and the left-hand screen 60 may have a similar wiper 70. In the area between the screens there is a common wiper 72 which also may function as a receiving area or trough for collecting the separated solids. Note that the direction of rotation will be such that the solids from both screens will be deposited on the center wiper or collecting area 72.

In the screening process using the apparatus shown in FIGS. 1 and 2, a stream of liquid and solids will flow from the pipe 28 into the trough 26. The baffle 30 will vector or direct the material to be screened toward the side of the screen which has just been cleaned by the right-hand wiper 52, as indicated in FIG. 3. In the alternative, the flume 26 may be formed to accomplish the same result without a separate baffle. Thus, the material to be screened will always be directed toward a clean area of the screen. The water will pass through the screening surface to the inside of the screen and will then flow from the inside of the screen, through the screen area presently at the bottom, down to the trough 32. As the separated liquid flows from the inside of the screen to the outside, it will clean the screen and thus provide the self-cleaning action described above. The wipers 52 assist in the cleaning function as they wipe or clean the exterior of the screen. The combination of the radial force of the rotating screen, the slant of the screen and the lead of the helix on the screen assist in moving the solids down to the discharge end where they may be conveniently removed.

Figure 9:
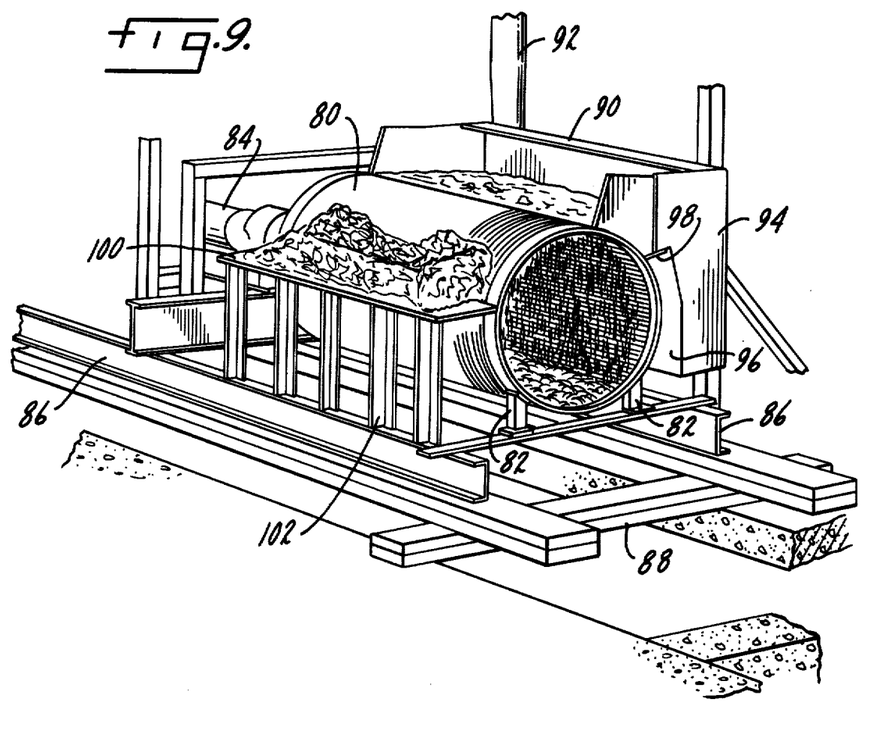
FIG. 9 is a perspective view of a modified form of the invention.
Figure 10:
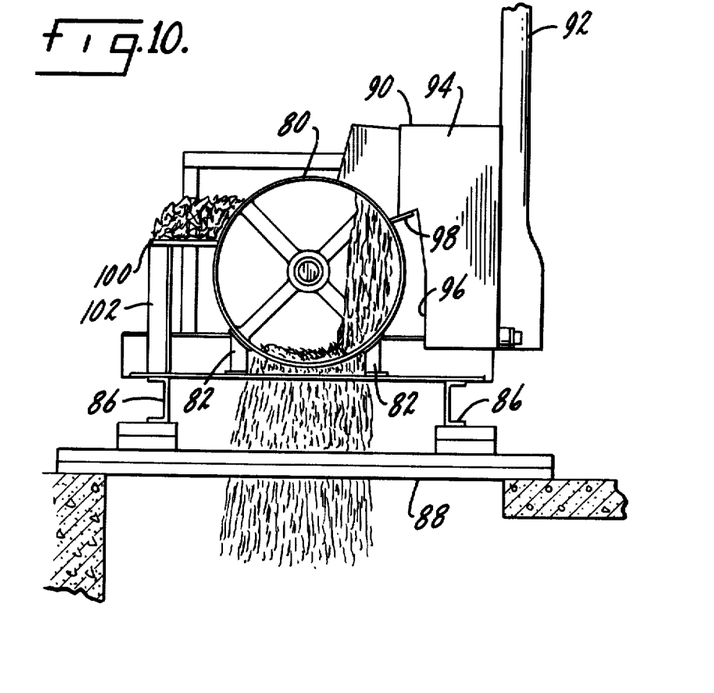
FIG. 10 is an end view of the screen of FIG. 9.

In FIGS. 9 and 10 a cylindrical screen 80 may have its front end supported on bearings 82, with the rear end of the screen suitably supported and driven by a drive means 84. The drive means may be similar to that shown in connection with FIGS. 1 and 2.

A support for the screen may be formed by rails 86, positioned on opposite sides of the screen, and suitably mounted on cross braces 88.

In contrast to the screening structures described above, the structure of FIGS. 9 and 10 will have a generally horizontal axis. At one side of the screen is a headbox 90, receiving a stream of liquid and solids through a pipe 92. The headbox 90 has sides, one of which is indicated at 94, a front 96, and a back. The headbox in effect forms an enclosure or reservoir for the entering stream of liquid and solids.

The headbox 90, as shown particularly in FIG. 9, will extend substantially the entire length of the screen 80. Preferably, there may be a small space between the sides 94 of the headbox and the end of the screen 80. Baffles 97 can be slightly inset from sides 94 in order to confine and direct fluid over the screen. As indicated in FIG. 10, the headbox is generally along one side of the screen, parallel to the screen axis. A wiper is indicated at 98 and will have an edge bearing against the surface of the screen, as described in connection with the other forms of the invention. The wiper 98 may be integral with the headbox, or it may be separate, and may form various angles with the axis of the screen. For example, a plane passing through the axis of the screen and parallel with the wiper may form an angle with the horizontal anywhere from on the order of about 10° to one the order of about 30°.

On the opposite side of the screen from the headbox 90 is a combination platform and wiper 100 supported by braces 102, with the platform being positioned to receive the dewatered solids.

In operation, liquid and solids will pass from pipe 92 into the headbox 90. As the screen slowly rotates, the screening surface will receive liquid and solids from the upper surface of the reservoir in the headbox. As the screen turns, it will carry the solids onto the platform 100, with the liquid falling through the screen, as particularly shown in FIG. 10. The solids, after being placed on the platform 100, may be removed in a convenient manner. Of importance, and particularly shown in FIG. 10, is that the separated liquid, as it falls down through the screen, will tend to concentrate along the right-hand side of the screen in FIG. 10 to thus form a column of water to clean the screen area moving up toward the open top of the headbox 90. Thus, there is no necessity, in the form of the invention shown in FIGS. 9 and 10, to have a funnel to concentrate the liquid, as the location of the headbox, along one side of the screen, tends to concentrate the liquid flowing through the screen to increase the self-cleaning action of the liquid.

Figure 11:
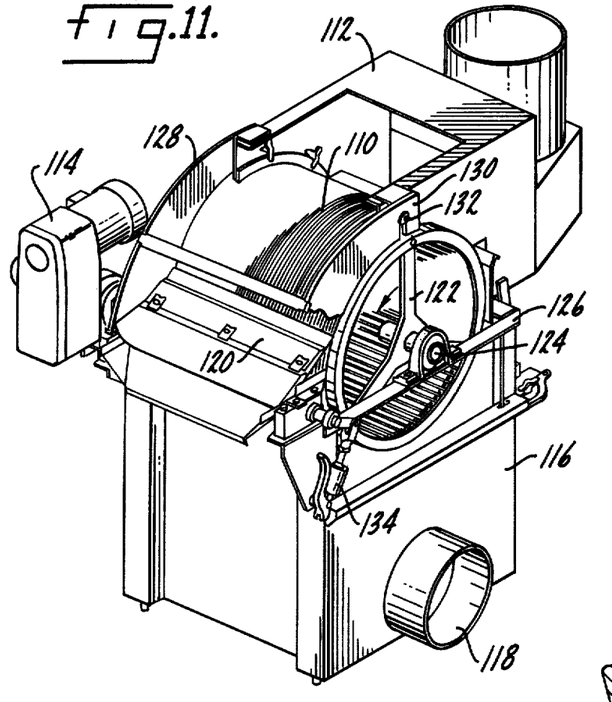
FIG. 11 is a diagrammatic illustration of a further form of the invention.

In FIG. 11, a screen 110 may be similar to the screen shown in FIGS. 9 and 10, with the headbox being indicated at 112. A drive for the screen is shown generally at 114 and the assembly made up of headbox 112, drive 114 and screen or cylinder 110, may all be mounted on top of a suitable tank or the like 116 having an effluent discharge 118. A solids receiving station or "doctor" structure is indicated generally at 120 and is on the side of the cylinder or screen 110 opposite from the head box 112. The righthand end of screen 110 may have a yoke 122 mounting an axle 124, with the axle 124 being journaled in a support structure 126. The opposite end of the cylinder may be similarly mounted, although there will be a drive connection at that end.

There may be solid containment arms 128 and 130 positioned on opposite ends of the screen and suitably attached to the headbox 112 as shown at 132. Thus, there is a channel or path, defined by the arms 128 and 130, to guide the solids as they are moved from the headbox across to the discharge assembly and doctor 120.

The doctor assembly 120 may be movable or adjustable and its position is controlled by an assembly 134.

As indicated above, the particular size, shape and arrangement of the individual screen bars is highly important.

Figure 12:
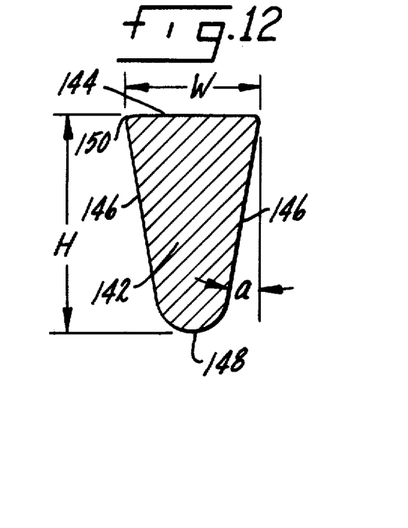
FIG. 12 is a cross section through a single screen bar.
Figure 13:
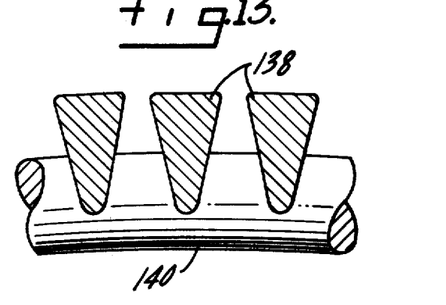

Looking particularly at FIG. 12, each of the bars 142 has an outer face 144 with a designated width W. In like manner, immediately adjacent each of the outer faces 144 are inwardly tapering sides 146, each of which have a radial thickness or height indicated by H. The lower inner surface of each of the bars 142 may be curved, as indicated at 148. The invention should not be limited to bars with tapering sides which extend the full distance H. In some applications the tapering sides may terminate prior to the innermost point of the bar and there may then be parallel sides. In either event, the relationship between the dimensions of the bars 142 is important. It has been determined that the ratio of H/W should be greater than 1 and less than 2 in order to have a screen which has the necessary self-cleansing properties and the requisite strength in the bar.

The angle (a) formed by the inwardly-tapering sides 146 and a line generally perpendicular to the outer surface W, should be greater than about 7° and less than about 45°. It has been determined that when this angle is less than about 7°, there tends to be a packing of solid spongy material which has passed through the outer openings between bars. On the other hand, when the angle is greater than about 7°, the spongy material does not pack, but tends to be forced by the water through the screen, leaving free unblinded openings for the filtering and screening of the liquid-solid mixture. If the angle becomes too great, i.e., above about 45°, the screen itself is sufficiently weakened because of the cross sectional shape of the bars, that the unit has a tendency to have reduced life. Accordingly, these limits are important and screens formed with bar relationships outside of these limits will not satisfactorily perform their intended purpose.

Although I have described the angle (a) as being greater than about 7° and less than about 45°, it should be understood that the total included angle between extensions of adjacent bar sides is greater than about 14° and less than about 90°. This included angle may be formed by adjacent bars having symmetrical sides or by adjacent bars having non-symmetrically arranged sides. The side 146 has been described as forming a particular angle with a line perpendicular to face 144. It should be recognized that side 146 may have a convex or concave shape to it and such structure would still be within the scope of the invention. What is important is the size and shape of the opening between bars and this may be arrived at by bar sides of somewhat varying configuration all of which would have the basic angular relationship described.

In like manner, the relationship of the diameter of the screen and the ratio of screen diameter to the thickness of each of the bars 142 or the distance H is important. It has been determined that the ratio of screen diameter to H must be greater than about 75 in order to have a sufficiently large screen to provide the cascading free fall of water to self-clean the spaces between the bars as the screen rotates.

The manner in which the individual bars are attached to the support structure may vary. There may be spaced support rods, as shown herein, or there may be an underlying support structure. The bars may be attached by welding, epoxy or other types of cement, mechanical fasteners or the like. The particular fastening or support means is not important, as long as there is structural integrity and the requisite strength required for the unit's operation. In one satisfactory form of support structure, the minimum clearance between the outside bar surface 144 and the outside of the support structure is W/2.

In the manufacturing process, the actual shape of the cylinder is slightly polygonal because during welding or during a cementing process, there are certain flattened areas created between adjacent bars. Even though there is a slight polygonal shape, nevertheless, the screen can be considered to be basically cylindrical.

As shown particularly in FIG. 12, the junction 150 between the outer surface or face 144 and the adjacent tapering sides 146 may be slightly rounded. This is only brought about by manufacturing and does not essentially change the relationship between these surfaces.

In some forms of the invention there may be a plug closing the forward or outer end of the screen to keep liquid from splashing out. The plug may be loosely fitting and may be removed for inspection or servicing of the unit.

The invention is particularly advantageous in sanitary sewage applications in which storm water overflow becomes a problem. A heavy rainfall has the effect of flushing out sewers, releasing accumulated grease and fibers. Screens without means for self-cleaning quickly clog in storm water overflow situations. Since the present invention has both self-cleaning and continuous cleaning by the wipers, the screen remains free and the weight of the separated solids will remain consistent, indicating that there is no water within the solids.

The speed of the screen may vary with different applications. In sanitary uses a speed of three lineal inches per second has been found to be satisfactory. In the separation of textile fibers or meat packing waste, other speeds may be useful. In general, speeds between one and 20 lineal inches per second are satisfactory. In some situations the screen speed may be variable to accomodate changes in hydraulic and suspended solids loading.

Whereas the preferred form of the invention has been shown and described herein, it should be realized that there may be many modifications, substitutions and alterations thereto.

I claim:

1. In a device for separating and dewatering the generally spongy solids from the liquid in sanitary sewage, food processing, meat packing and the like, including a cylindrical screen having a screening medium about its outer periphery made up of spaced circumferentially arranged, generally parallel bars surrounding a generally open interior, means supporting the screening medium for rotation about a generally horizontal axis so that the surface of the screening medium is rising on one side and descending on the other, means for rotating the screening medium, a headbox containing a liquid-solid medium to be separated directly adjacent the surface of the screening medium and opening against the rising side thereof above a horizontal plane through its axis, a solids discharge adjacent the outer surface of the screening medium and spaced from the headbox in the direction of its rotation and beyond a vertical plane through its axis, movement of the screening medium carrying the separated solids from the headbox toward the solids discharge with the majority of the liquid passing through the screening medium at the headbox and falling freely in a cascading column down to the bottom area of the screening medium toward the inner surface of the medium primarily in an area on the rising side below the horizontal plane through its axis, the bars that make up the screening medium each having a generally flat outer face which, as a group, make up a cylindrical, generally smooth exterior surface with limited openings between adjacent bars to effect maximum separation adjacent the headbox followed by transportation of the separated solids to the solids discharge, the bars having inwardly diverging sides which define upwardly opening cleaning troughs at the bottom of the cascading column, the side of one bar defining an included angle with the opposed side of an adjacent bar greater than about 14° and less than about 90°, with ratio of screen diameter to radial bar thickness being no less than about 75.

2. The structure of claim 1 further characterized in that the included angle between the opposed sides of adjacent bars is on the order of 26°.

3. The structure of claim 1 further characterized in that the separation of the bars is on the order of 0.060 inches.

4. In a device for separating and dewatering the generally spongy solids from the liquid in sanitary sewage, food processing, meat packing and the like, including a cylindrical screen having a screening medium about its outer periphery made up of spaced circumferentially arranged, generally parallel bars surrounding a generally open interior, the medium being at least 11 inches in diameter so as to provide a substantial free fall of the liquid resulting in appreciable impact when the liquid hits the bottom area of the medium, means supporting the screening medium for rotation and means for rotating it, a headbox containing a liquid-solid medium to be separated and opening against the medium at a point above a plane through its axis, a solids discharge adjacent the outer surface of the screening medium and spaced from the headbox in the direction of its rotation, movement of the screening medium carrying the separated solids from the headbox toward the solids discharge with the liquid passing through the screening medium and falling freely in a cascading free column down to the bottom area of the screening medium, the bars that make up the screening medium each having a generally flat outer face which, as a group, make up a cylindrical, generally smooth exterior surface with limited openings between adjacent bars to effect maximum separation adjacent the headbox followed by transportation of the separated solids to the solids discharge, the bars having inwardly diverging sides which define downwardly opening separating slots at the top and upwardly opening liquid-collecting cleaning troughs at the bottom of the cascading column, the side of one bar defining an included angle with the opposed side of an adjacent bar greater than about 14° and less than about 90°, with a ratio of screen diameter to radial bar thickness being no less than about 75.

5. The structure of claim 4 further characterized in that the included angle between the opposed sides of adjacent bars is on the order of 26°.

6. The structure of claim 4 further characterized in that the separation of the bars is uniform, from one end of the screening medium to the other and on the order of 0.060 inches.

7. The structure of claim 4 further characterized in that the axis of the screening medium is arranged generally horizontal.

8. The structure of claim 4 further characterized in that the headbox is on one side of the screening medium and opens against the rising side thereof and the solids-discharge is on the other side of the screening medium beyond a vertical plane through the axis of the screening medium and on the descending side thereof.

9. In a device for separating and dewatering the generally spongy solids from the liquid in sanitary sewage, food processing, meat packing and the like, including a cylindrical screen having a screening medium about its outer periphery made up of spaced circumferentially arranged, generally parallel bars surrounding a generally open interior, the medium being at least 11 inches in diameter so as to provide a substantial free fall of the liquid resulting in appreciable impact when the liquid hits the bottom area of the medium, means supporting the screening medium for rotation and means for rotating it, a headbox containing a liquid-solid medium to be separated and opening against the medium at a point above a plane through its axis, a solids discharge adjacent the outer surface of the screening medium and spaced from the headbox in the direction of its rotation, movement of the screening medium carrying the separated solids from the headbox toward the solids discharge with the liquid passing through the screening medium and falling freely in a cascading free column down to the bottom area of the screening medium, the bars that make up the screening medium each having a generally flat outer face which, as a group, make up a cylindrical, generally smooth exterior surface with limited openings between adjacent bars to effect maximum separation adjacent the headbox followed by transportation of the separated solids to the solids discharge, the bars having inwardly diverging sides which define downwardly opening separating slots at the top and upwardly opening liquid-collecting cleaning troughs at the bottom of the cascading column with the included angle between the opposed sides of adjacent bars being at a predetermined angle great enough so that the spongy solids will not clog to any appreciable extent between the opposed faces on top and will clear when subjected to the impact of the cascading column at the bottom.

* * * * *